US 6,591,591 B2

(12) United States Patent
Coers et al.

(10) Patent No.: US 6,591,591 B2
(45) Date of Patent: Jul. 15, 2003

(54) HARVESTER SPEED CONTROL WITH HEADER POSITION INPUT

(75) Inventors: Bruce Alan Coers, Hillsdale, IL (US); Jerry Dean Littke, Hillsboro, ND (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/918,266

(22) Filed: Jul. 30, 2001

(65) Prior Publication Data
US 2003/0019196 A1 Jan. 30, 2003

(51) Int. Cl.[7] .......................... A01F 12/00; A01D 75/18
(52) U.S. Cl. .................. 56/10.2 G; 56/10.2 R; 460/6; 701/50
(58) Field of Search .................. 56/10.2 R, 10.3, 56/10.2 C, 10.2 G, 10.5, 10.8, 10.6, 11.1, 11.9, 12.1, 14.7, 14.9, 15.9, 208, 210, 214, DIG. 15; 460/1, 4, 6; 701/50, 53

(56) References Cited

U.S. PATENT DOCUMENTS

| 3,540,028 | A |   | 11/1970 | Love .......................... 340/267 |
| 3,606,742 | A |   | 9/1971  | Wieneke et al. ............. 56/10.2 |
| 4,130,980 | A | * | 12/1978 | Fardal et al. ........... 56/DIG. 15 |
| 4,487,002 | A |   | 12/1984 | Kruse et al. .................. 56/10.2 |
| 4,513,562 | A | * | 4/1985  | Strubbe .................... 56/10.2 G |
| 4,727,710 | A | * | 3/1988  | Kuhn ....................... 56/10.2 G |
| 4,776,153 | A |   | 10/1988 | DePauw et al. ............. 56/10.2 |
| 4,893,241 | A | * | 1/1990  | Girodat et al. ........... 56/10.2 G |
| 4,934,985 | A | * | 6/1990  | Strubbe .......................... 460/4 |
| 5,488,817 | A | * | 2/1996  | Paquet et al. ............ 56/10.2 R |
| 5,535,577 | A | * | 7/1996  | Chmielewski et al. ... 56/10.2 E |
| 5,704,200 | A |   | 1/1998  | Chmielewski, Jr. et al. ....................... 50/10.2 E |
| 5,937,621 | A |   | 8/1999  | Eggenhaus ............... 56/10.2 E |
| 6,036,597 | A | * | 3/2000  | Arner ............................. 460/6 |
| 6,073,428 | A | * | 6/2000  | Diekhans ................. 56/10.2 R |
| 6,119,442 | A | * | 9/2000  | Hale ........................ 56/10.2 H |
| 6,167,337 | A | * | 12/2000 | Haack et al. .................. 701/50 |
| 6,315,658 | B1 | * | 11/2001 | Weber ............................ 460/6 |
| 6,359,403 | B1 | * | 3/2002  | Pollklas et al. ............. 180/65.1 |
| 6,397,571 | B1 | * | 6/2002  | Ehrecke ................... 56/10.2 R |
| 6,431,981 | B1 | * | 8/2002  | Shinners et al. ......... 56/10.2 R |

FOREIGN PATENT DOCUMENTS

| DE | 24 36 072 | 2/1975 |
| DE | 27 43 961 | 4/1978 |
| GB | 2 057 837 | 4/1981 |

* cited by examiner

Primary Examiner—Thomas B. Will
Assistant Examiner—Nathan Mammen

(57) ABSTRACT

A system for harvester speed control includes a header position sensor connected to a processor. If the header is lowered during crop cutting, harvester speed is immediately decreased to prevent a sudden increase in material downstream of the feeder house input. The percentage speed reduction preferably is approximately equal to the estimated percentage increase in material for the given height change as set manually by the operator, calculated during a brief calibration process, or derived utilizing an adaptive learning technique. Signals from a throughput transducer and from harvesting quality transducers such as grain loss transducers are communicated to the processor to determine desired harvester speed.

18 Claims, 4 Drawing Sheets

HARVESTER SPEED CONTROL WITH HEADER POSITION INPUT

BACKGROUND OF THE INVENTION

The present invention relates generally to agricultural harvesters and, more specifically, to a speed control for such harvesters.

A self-propelled harvester such as a combine typically includes a header for engaging a crop. An automatic height control system utilizing a mechanical feeler or an acoustic sensor or similar non-contact ground sensing device maintains the header within a desired range of heights above the ground. The operator can also manually control the header to raise and lower the unit as necessary to compensate for different field conditions such as high or low yield conditions, irregular ground surface conditions, and downed crop conditions. In combines having a cutter bar which severs the crop below the crop heads and directs the severed crop to a central feeder house, changing the header height usually results in a significant change of the amount of material entering the feeder house. Lowering the header can immediately result in an increase in the material that will be input to the feeder house and processed by the harvester. Raising the header reduces the amount of material.

Various devices are available to sense the amount of material entering the feeder house or threshing and separating assembly and change the speed of the combine in response to changes in material to maintain a generally constant throughput, the delay in response time for such systems often results in an initial excessive amount of material in the feeder house, beater and threshing and separating assembly shortly after the header is quickly lowered for any reason. As a result of such header lowering, the combine becomes heavily loaded, increasing grain loss, power requirements and the potential for blockages, wear and premature component failure. Raising the header results in a short period of combine operation below capacity so that machine productivity is reduced

BRIEF SUMMARY OF THE INVENTION

It is therefore an object of the present invention to provide an improved speed control system for a combine or other harvester having an adjustable header with a cutter bar. It is a further object to provide such a system which overcomes most or all of the aforementioned problems.

It is another object of the invention to provide such a harvester speed control system which reduces the problems associated with rapid variations in harvester throughput caused by header repositioning. It is another object to provide such a system that reduces or eliminates blockages and excessive loading, wear and grain loss caused by such repositioning. It is another object to provide such a system which reduces or eliminates lower machine productivity because of delays in response to throughput changes resulting from cut height changes.

It is yet another object of the invention to provide an improved harvester speed control system wherein harvester speed is quickly changed to compensate for the increase or decrease in throughput caused by a change in material volume that is a function of a cut height change. It is yet another object to provide such a system which is easily calibrated.

The system for improved harvester speed control includes a header position sensor such as a feeder house position transducer providing an indication of raising or lowering of the header. The output of the header position sensor is connected to a processor which estimates the change in volume of material that will have to be processed by the harvester as a result of a header height change. The volume change can be estimated by a simple calibration routine based on crop height. Volume change estimates are stored in the form of a table in processor memory and can be easily updated as necessary as crop conditions change. In another embodiment, automatic calibration based on cutting height changes and resulting feed rate changes using adaptive learning techniques is employed.

Combine speed adjustments are, normally controlled by a conventional speed control as a function of outputs of one or more sensors including a throughput sensor located downstream of the header. However, if the header is lowered, combine speed is immediately lowered to prevent a sudden increase in material downstream of the feeder housing input. The percentage speed reduction preferably is selected based upon estimated percentage increase in material for the given height change as determined during the calibration process. After a preselected delay, period wherein the material input to the header after the height change is processed downstream of the header, normal speed control based on throughput is resumed. If the header is raised, the speed of the combine is increased to maintain throughput.

These and other objects, features and advantages, of the present invention will become apparent to one skilled in the art upon reading the following detailed description in view of the drawings.

DETAILED DESCRIPTION OF THE DRAWINGS

Figure 1:
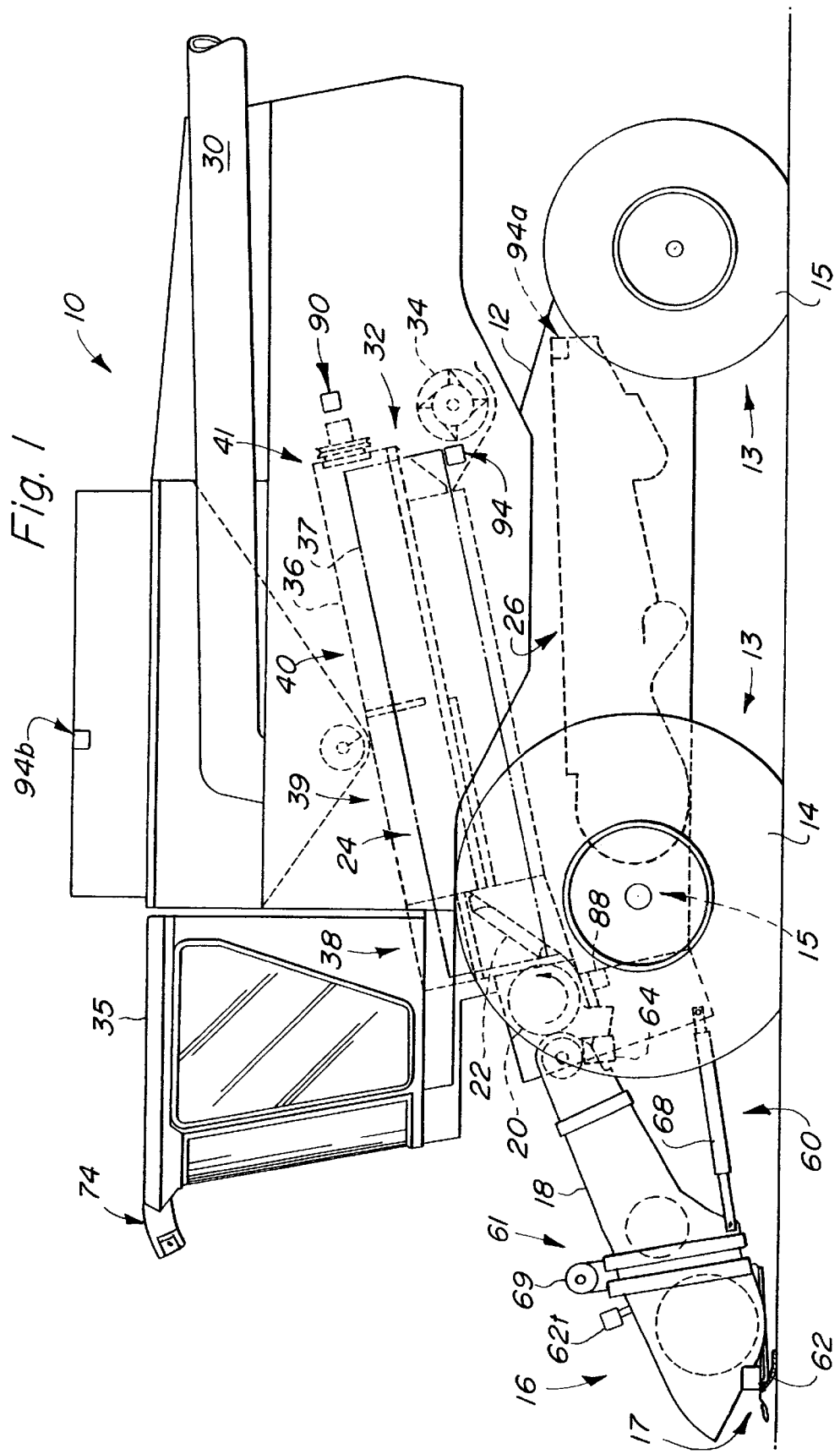
FIG. 1 is a side view of a harvester with a header height control system.

Referring now to FIG. 1, therein is shown an agricultural harvester or combine 10 comprising a main frame 12 supported for movement by wheel structure 13 including front drive wheels 14 driven by an electronically controlled hydrostatic transmission 15. Although wheels are shown, the wheel structure 13 could include or be composed of ground engaging tracks.

A vertically adjustable header or harvesting platform 16 with a cutter bar 17 is used for cutting a standing crop and directing cut material to a feeder house 18. The feeder house 18 is pivotally connected to the frame 12 and includes a conveyor for conveying the cut material to a beater 20. The beater 20 directs the material upwardly through an inlet transition section 22 to a rotary threshing and separating assembly 24. Other orientations and types of threshing structures and other types of headers 16, such as transverse frame supporting individual row units, could also be utilized.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from an operator's cab 35.

The rotary threshing and separating assembly 24 comprises a cylindrical rotor housing 36 and a hydraulically driven rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38.

Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24. Although the harvester 10 is shown as a combine 10 for harvesting grain, it is to be understood that the present invention may also be utilized with other types of harvesters having vertically controlled headers.

The height of the header 16 is controlled by a hydraulic lift system indicated generally at 60, and a header tilt system indicated generally at 61 may also be provided to maintain the header generally parallel to the surface of the ground. Feelers 62 or other conventional height sensing devices such as acoustic sensors 62x supported from transversely spaced locations on the header 16 provide an indication of header height. A feeder house transducer 64 provides a signal dependent on the angle of the feeder house 18 relative to the frame 12. The angle signal provides an indication of the height of the header 16. The signals from the devices 62, 62t and 64 are connected via lines 62a and 64a (FIG. 4) to a controller 65 which includes a processor 66 connected to electrohydraulic valve structure 67 to control hydraulic fluid flow to and from one or two lift cylinders 68 connected between the feeder house 18 and the frame 12 to operate the lift system 60 to maintain the header within a selected operating height range when the system is operated automatically. The operator can select and change the operating height using a raise-lower control 70 in the cab 35. Typically, when the operator begins harvesting, the operator initiates header lowering using the control 70, and the cylinder 68 is quickly retracted until a preselected feeder house position is reached as indicated by the signal from the feeder house transducer 64. Thereafter, the controller 65, utilizing the height signals on lines 62a, operates the cylinder 68 to move the header 16 towards the selected operating position and maintains the header within a selected operating range. Additional height control signal inputs, such as from an optical system 74, can be provided for use in automatically maintaining a generally constant cut below crop head distance.

The valve structure 67 also controls extension and retraction of a tilt cylinder 69 to rotate the header 16 about a fore-and-aft extending axis for operation parallel to the ground surface. When the signal from one or more sensors 62 and 62t on one side of the axis provides a raise indication while the signal from the opposite side provides a lower indication, the system will operate the cylinder 69 to tilt the header about the axis for the proper attitude correction. When sensors on both sides of the axis provide a raise or a lower indication, the cylinder 68 will be extended or retracted accordingly for the necessary height correction to maintain the header in a preselected range of operating heights. Such a height control system is shown and described in the aforementioned U.S. Pat. No. 4,776,153.

Harvester speed is controlled automatically by a speed control indicated generally at 80 including an electronic controller 82 operably connected to the hydrostatic transmission 15. The controller 82 adjusts a variable output pump in the transmission 15 to drive the wheels 14 at the desired operating speed. The operator can control speed in a manual mode through a conventional hydro control handle 84 located in the cab 35. The hydro control handle 82 establishes an upper speed limit for the range and speed is infinitely variable within the range. A radar ground speed sensor 88 or other speed indicating device provides a speed signal to the input of the controller 82.

Figure 2:
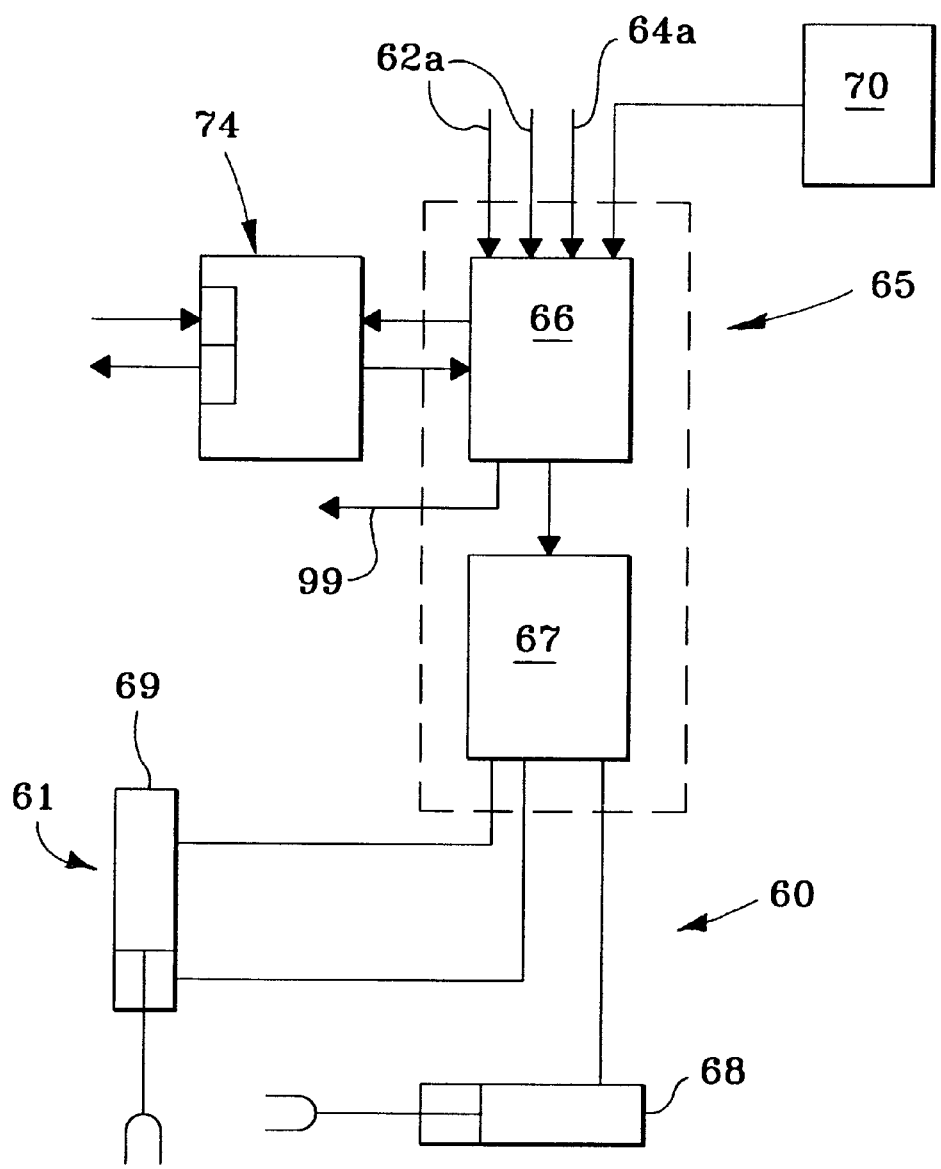
FIG. 2 is a schematic of a header lift and tilt control system for the harvester of FIG. 1.
Figure 3:
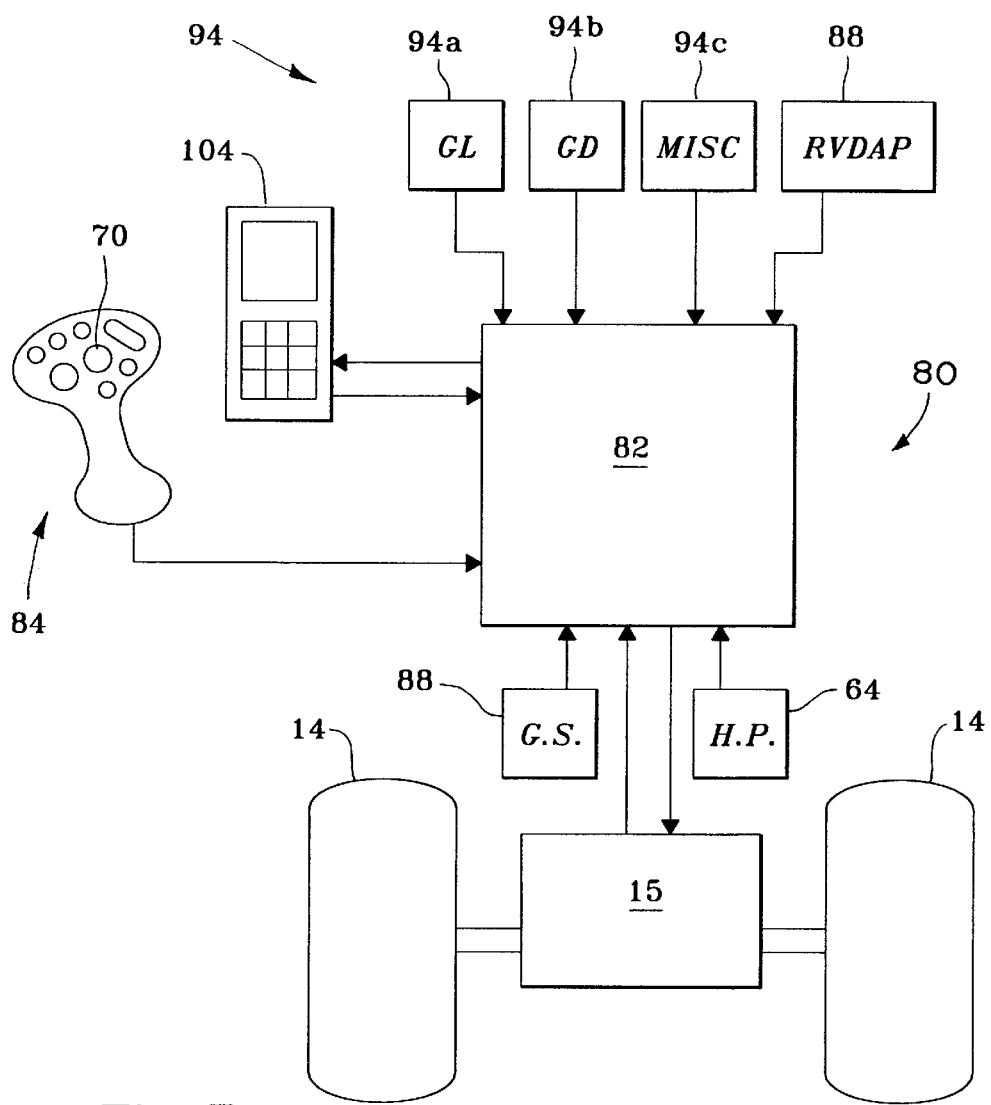
FIG. 3 is a schematic of a speed control system responsive to header height changes.

As shown in FIG. 2, a throughput transducer 90 provides a throughput signal to the input of the controller 82. Preferably, the rotor 37 is driven by a variable drive actuator, and the rotor variable drive actuator pressure (RVDAP) is monitored by the transducer 90. The speed control 80 can be set to adjust harvester speed to maintain a generally constant throughput, with the actual harvester speed increasing or decreasing depending on the throughput signal from the transducer 84. Inputs from sensors 94 providing grain loss (94a), grain damage (94b) and similar information (94c) indicative of the harvesting quality of the harvester are also provided to the speed control 80 so that harvester speed adjustments can also be made as a function of the harvesting quality signals. For example, if grain loss is greater than a desired upper limit, harvester speed will be automatically reduced to bring the quality variable within the desired range. If harvesting quality signals indicate low grain loss and/or damage or the like, and if throughput is below a maximum desired level, the controller will increase the harvester speed, up to a maximum speed determined by the setting of the control handle 84. It is to be understood that the present invention may be used with other primary speed control devices and techniques and that the above are given by way of example only.

The speed control 80 also receives header height information from the feeder house transducer 64 and is responsive to an indication from the transducer 64 that the header 16 is being lowered while crop is being cut for immediately slowing the harvester forward speed. If the operator lowers the cutting height of the header 16, for example, to pick up downed crop, such lowering is detected by the controller 82, and the controller, anticipating a sudden increase in the amount of material soon to be received by the feeder house 18, immediately decreases the speed of the harvester. Preferably, the percentage decrease in speed is at least equal to the estimated percentage increase in total material volume cut by the cutter bar 17 so that throughput remains generally constant or decreases slightly. After a short delay, the corresponding generally to the amount of time necessary for the first of the increased material cut to be completely processed by the harvester, normal speed control such as control based on throughput and/or harvesting quality signals or the like is resumed. If the operator raises the header 16 while crop is being cut, and harvesting quality and/or throughput signals are within acceptable ranges at the time of raising of the header, the controller 82 will increase the forward speed of the harvester immediately to maintain throughput at generally a constant level. However, if signals from the sensors 90 and 94 indicate harvesting quality is decreasing or throughput is increasing towards unacceptable levels at the time the header is raised, the controller 82 will prevent any substantial increase in speed based on header raising.

Information on speed change relative to header position change can be preset manually into memory in the controller 82 via operator interface 104 in the cab 35 according to harvest conditions to compensate for change in feedrate caused directly by a cut height change. Alternatively, the controller can automatically determine the effect that cutting height changes have on feedrate during initial operation, and a table of feedrate changes for feeder house position changes is stored in controller memory for later use by the controller 82 to correlate harvester speed changes with feeder house position changes. If desired, the processor 82 may also include fuzzy logic or other adaptive learning techniques for continually learning the effects of feedrate changes on header position changes and utilizing the learned information to more accurately correlate speed changes with header position changes to maintain a constant throughput.

Figure 4:
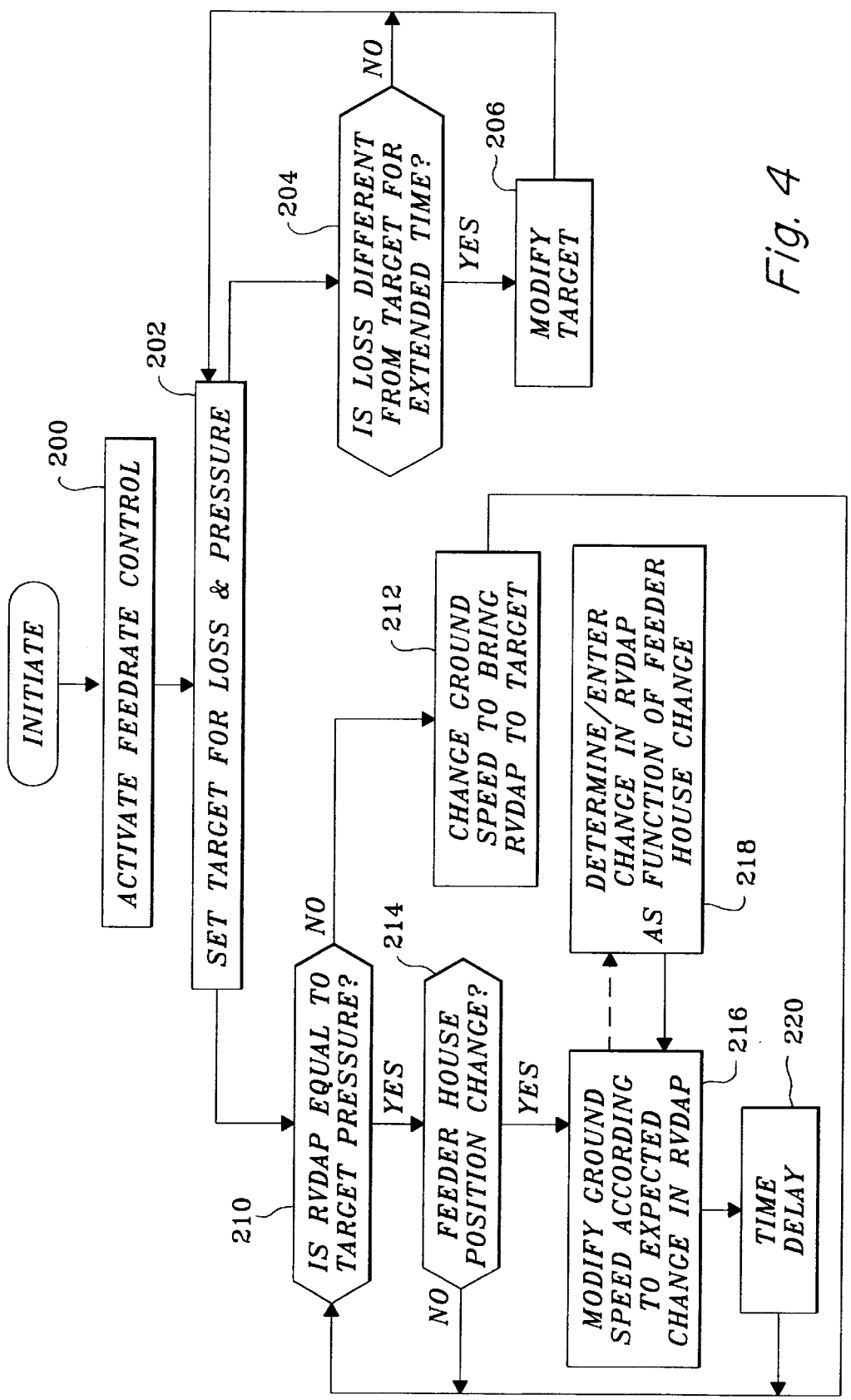
FIG. 4 is a flow diagram for the speed control system.

By way of example, a flowchart for operation of the processor 82 is shown in FIG. 4. After the feedrate control is activated, targets are set at 202 for throughput and grain loss. Initial targets may be entered by the operator based on his knowledge and experience, or targets stored in memory for the particular field and crop type or for the immediately preceding harvest conditions can be selected.

Throughput is measured as a function of RVDAP (transducer 90) and remains fairly constant with constant RVDAP. Actual grain loss is measured at 204 utilizing the outputs from the sensors 94a. If the measured loss: at 204 is consistently high or low over an extended period of time, the target RVDAP will be adjusted slowly at 206 to bring the grain loss to the desired level. Other harvest quality inputs may also be utilized to adjust the target RVDAP if desired.

During operation of the combine, RVDAP is continually monitored at 210. If RVDAP deviates from the desired range as set at 202–206, combine speed is increased or decreased at 212, depending on whether RVDAP is below or above the desired level. Once RVDAP is within the desired operating range, the output of the header position transducer(s) 64 is polled at 214 to determine if there has been an adjustment of the header that will cause a sudden ramp up or ramp down in the amount of material entering the feeder house. If there has been a change in header position, ground speed is modified immediately at 216 to compensate for the change in amount of material. If position has not changed, RVDAP is again checked against target pressure at 210.

If desired, the processor 66 can also be polled at 216 to determine if feeder house change is resulting primarily from signals from the cut below crop head optical sensor 74 indicating ground or crop contour changes of the type which will not significantly affect throughput. If so, the magnitude of the change in ground speed can be reduced accordingly at 216.

The actual correlation in feeder house change with RVDAP change and the resulting change required at 216 is provided by a subroutine indicated generally at 218 initiated with a feeder house position change during a calibration period. In the simplest embodiment, the operator can enter via operator interface 104 desired percentage ground speed changes for given feeder house position changes during an initial setup procedure. However, as pointed out above, the controller 82 can automatically determine the effect that cutting height changes have on RVDAP during an initial combine operation, and a table of RVDAP changes for feeder house position changes is stored at 218 so that ground speed modifications at 216 can be made according to information stored in the table. If desired, the processor 82 may also include fuzzy logic or similar adaptive learning structure for continually learning the effects of feedrate changes on header position changes at 218. The learned information, updated at regular intervals, is used to more accurately correlate speed changes with header position, changes to maintain a constant RVDAP for a generally constant throughput.

After the ground speed of the combine is modified at 216, RVDAP is again monitored against target pressure at 210 after a time delay at 220. The time delay is approximately equal to the time necessary for the material initially cut by the header after the header height change to completely be processed in the combine.

Having described the preferred embodiment, it will become apparent that various modifications can be made without departing from the scope of the invention as defined in the accompanying claims.

We claim:

1. A harvester having a frame supported on the surface of the ground by wheel structure for forward movement through a field of standing crop, the harvester including crop processing structure and a header for directing the crop to the processing structure, a header control system for adjusting the header vertically, wherein rate of material flow to the processing structure from the header is dependent on header vertical adjustment and forward speed, a harvesting control comprising:

a harvester speed control for controlling forward speed of the harvester through the field, transducer structure for providing a header position signal;

a throughput transducer located in the processing structure for providing a throughput signal; and wherein the harvester speed control is responsive to a header position signal to immediately decrease the forward speed of the harvester prior to the throughput signal changing as a result of header position change when the header position signal indicates a lowering of the header, thereby reducing sudden increases in the rate of material flow to the processing structure resulting from changes in the vertical adjustment of the header.

2. The harvesting control as set forth in claim 1 wherein the harvester speed control is responsive to the throughput signal to control harvester speed to maintain harvester throughput generally constant and immediately reduces the forward speed upon receipt of an indication of lowering of the header, wherein, after a time delay after the immediate reduction in speed, harvester speed is again made responsive to the throughput signal.

3. The harvesting control as set forth in claim 1 wherein amount of the decrease in forward speed is dependent on the amount of change in the header position.

4. The harvesting control as set forth in claim 1 wherein the harvester speed control is responsive to a header position signal to increase the forward speed of the harvester when the header position signal indicates a raising of the header.

5. The harvesting control as set forth in claim 4 further comprising a harvesting quality transducer connected to the speed control, and wherein the increase in the forward speed is dependent on harvesting quality.

6. The harvesting control as set forth in claim 5 wherein the harvesting quality controller comprises a grain loss monitor.

7. The harvesting control as set forth in claim 1 wherein the harvester speed control is responsive to the throughput signal to maintain the amount of material within a preselected range.

8. The harvesting control as set forth in claim 7 wherein the harvester speed control is responsive to the header position signal to immediately reduce the forward speed of the harvester when a lowering of the header is indicated, even if the throughput signal indicates that the amount of material is within the range when the header is lowered.

9. The harvesting control as set forth in claim 8 wherein the harvester speed control is responsive to the header position signal to immediately increase the forward speed of the harvester when the header position signal indicates a raising of the header if the throughput signal indicates that the amount of material is within the range when the header is raised.

10. A harvester having a frame supported on the surface of the ground by wheel structure for forward movement through a field of standing crop, the harvester including crop processing structure and a header for directing the crop to the processing structure, a header control system for adjusting the header vertically, wherein rate of material flow to the processing structure from the header is dependent on header vertical adjustment and forward speed, a harvesting control comprising:

a harvester speed control for controlling forward speed of the harvester through the field, transducer structure for providing a header position signal;

wherein the harvester speed control is responsive to a header position signal to decrease the forward speed of the harvester when the header position signal indicates a lowering of the header, thereby reducing sudden increases in the rate of material flow to the processing structure resulting from changes in the vertical adjustment of the header; and further comprising a throughput sensor on the harvester for providing a process indication of the amount of material being processed by the harvester, a processor for receiving the header position signal and the process indication and for estimating a change in throughput for the header position change prior to the process indication reflecting a change in the amount of material in the processing structure as a result of the lowering of the header, and wherein the decrease in forward speed is dependent on estimated change in throughput based on previous experience rather than on a real time change in the process indication at the time of the lowering of the header.

11. A method of operating a harvester for harvesting a standing crop, the harvester having a vertically adjustable cutting platform and an electronic speed control for automatically adjusting harvester speed, wherein the height of the cutting platform and the harvesting speed establish a harvester throughput, the method comprising:

establishing a desired speed based upon at least one monitored harvester condition depending at least in part on the throughput;

maintaining the harvester speed: generally at the desired speed;

detecting a change in the vertical position of the cutting platform;

estimating a change in the harvester throughput resulting from the detected change in position; and changing the harvester speed in dependence on the estimated change in the throughput, prior to the monitored condition substantially changing as a result of the change in vertical position, to maintain a generally constant throughput and prevent overload and undercapacity conditions as a result of changes in height of the cutting platform.

12. The method as set forth in claim 11 wherein the monitored harvester condition comprises grain loss.

13. The method as set forth in claim 11 wherein the step of estimating a change comprises correlating change in vertical position with a change in the throughput based on previous experience.

14. The method as set forth in claim 13 including providing an adaptive learning system, and utilizing the adaptive learning system to establish the correlation between change in vertical position and change in throughput.

15. The method as set forth in claim 11 wherein the step of establishing a desired speed includes setting a target monitored harvester condition output and a target throughput, and monitoring actual harvester condition output and modifying the set target throughput if monitored harvester condition output varies from the set target output.

16. The method as set forth in claim 15 wherein the monitored harvester condition is grain loss.

17. The method as set forth in claim 11 wherein the step of detecting a change in vertical position includes monitoring feeder house angle.

18. A method of operating a harvester for harvesting a standing crop, the harvester having a vertically adjustable cutting platform and an electronic speed control for automatically adjusting harvester speed, wherein the height of the cutting platform and the harvesting speed establish a harvester throughput, the method comprising:

establishing a desired speed based upon at least one monitored harvester condition depending at least in part on the throughput;

maintaining the harvester speed generally at the desired speed;

detecting a change in the vertical position of the cutting platform;

estimating a change in the harvester throughput resulting from the detected change in position;

changing the harvester speed in dependence on the estimated change in the throughput, prior to the monitored condition substantially changing as a result of the change in vertical position, to maintain a generally constant throughput and prevent overload and undercapacity conditions as a result of changes in height of the cutting platform; and wherein the step of estimating a change in the harvester throughput resulting from the detected change in position includes the step of determining if the change in position results from a change in crop or ground contour conditions that will not appreciably affect throughput.

* * * * *